March 23, 1971  S. B. WESTIN  3,572,256
CONFECTIONERY ARTICLE MOULD
Filed July 1, 1968
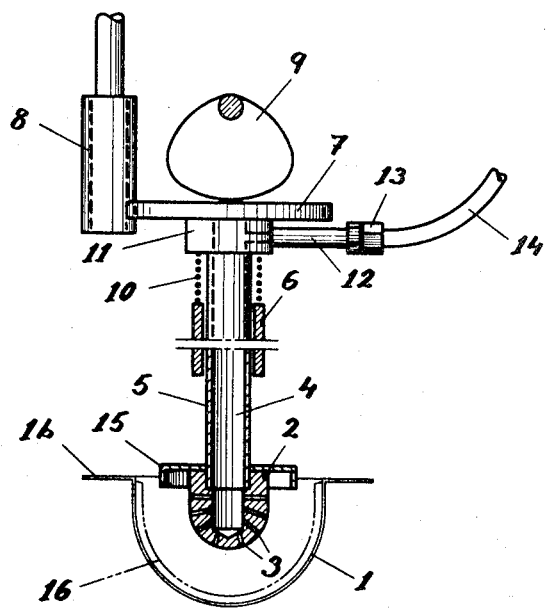
INVENTOR
S. B. WESTIN
By Glascock, Downing & Seebold
ATTORNEYS.

3,572,256
CONFECTIONERY ARTICLE MOULD
Sven Birger Westin, Skarsgatan 74, Goteborg, Sweden
Filed July 1, 1968, Ser. No. 741,504
Int. Cl. A23g 7/00
U.S. Cl. 107—8                               5 Claims

ABSTRACT OF THE DISCLOSURE

For moulding shell-like articles of confectionery the molten confectionery material is sprayed onto the walls of an open mould by means of a nozzle, which is reciprocable towards and away from the mould and which preferably also is rotatable during the spraying operation. In order to prevent confectionery material from flowing over the rim of the mould and onto the portions of the mould plate surrounding the mould proper the nozzle, about level with the rim of the mould, is provided with a shield, which deflects the droplets of confectionery material moving upwards.

---

This invention relates to the moulding of confectionery material, preferably chocolate, in open moulds in a thin layer over the mould surface. The moulding is mainly related to the manufacture of hollow forms adapted to be filled with a soft edible substance. A further object of the invention is to provide a device for accomplishing the moulding.

The manufacture of filled or hollow confectionery is usually performed by filling the moulds with, for instance, chocolate material up to the edge of the mould and usually above the edge thereof, whereafter the moulds are turned upside down so that excess chocolate flows out of the mould, the chocolate material remaining in the mould forming a shell-like layer on the walls of the mould. The moulds are then cooled by blowing air onto their undersides so that the chocolate hardens. The moulds, which usually are arranged as a plurality of recesses in a metal plate, thereafter pass a rake-like device which scrapes off excessive chocolate material. Further treatment of these moulded articles of chocolate consists in filling the shells with a further edible substance and closing the shells. This is, however, not further described in this application, as these steps may be performed according to any of the well known methods for accomplishing same.

The metal moulds are very expensive and there is a trend in the chocolate industry to turn to moulds which are formed by heatpressing of continuous strips of a plastic material. These moulds are so inexpensive that they may be used as the wrapping of the finished product. To that end a further sheet of plastic material is welded to the part of the mould sheet located between the various mould units. It is of great importance that these sheet parts, from esthetical point of view as well as for welding reasons, are free from chocolate. A mould obtained by pressing recesses in a plastic sheet does not have the same exact dimensioned upper surface evenness or stability as the old type of metal mould. This makes it impossible to use a rake device to remove the excess chocolate material. It is furthermore very complicated to effect an upside-down turning of a plastic mould sheet, on account of the fact that the bending of said mould sheet brings about an undesirable deformation of the recesses of the thin-walled sheets, due to the comparatively poor structural stability of the mould material. It has furthermore been very difficult to produce uniform, and at the same time, thin chocolate shells by means of moulds of recessed plastic sheet material.

The object of the present invention is to eliminate all the above-mentioned drawbacks and this invention is mainly characterized in that the heated confectionery material is sprayed onto the walls of the mould depressions in a comparatively finely divided state, the mould and the confectionery material preferably being simultaneously cooled.

The invention is more particularly described hereinafter with reference to the accompanying drawing, which illustrates by way of example, a preferred embodiment for manufacturing the confectionery article.

The mould 1, in which the moulding is to be performed, is obtained for example by heatpressing a series of recesses in a sheet of plastic material. This sheet is fed stepwise through the moulding machine in such a manner that the series of moulds is at rest during the actual moulding. The sheet, the width of which corresponds to the width of the moulding machine, is provided with a number of recesses arranged in lateral rows, each recess corresponding to the outer dimension of the article to be made. A row of filling devices is arranged at a moulding station, the number of devices corresponding to the number of recesses in each row. Several filling devices may occasionally be necessary for completely filling each row of moulds depending on the size of the sheet. One filling device is shown by way of example in the drawing, but the intention is that the machine at the moulding station should be provided with the necessary number of filling devices for simultaneous operation over the whole width of the sheet, or possibly for simultaneous moulding of two or more of mould rows arranged in succession.

The moulding of the chocolate material is supposed to occur when said material through heating by suitable means (not shown on the drawing) has been brought to an easy flowing molten state, and its application in the mould produces a comparatively thin layer. For this reason the device is provided with a nozzle 2 formed as a rotating body, provided with a number of spraying openings 3. The nozzle 2 is provided with a central inlet channel, connected to a central channel 4 in a hollow shaft 5, to which the nozzle preferably is detachably connected, for example by means of screwthreads. The shaft 5 is rotatably and reciprocably guided in a bearing sleeve 6. This is located in a mounting pillar (not shown on the drawing). The bearing arrangement of shaft 5 is provided to enable rotation of the nozzle 2 in relation to the mould 1 during the spraying in order to obtain a uniform moulding layer. This rotation of the nozzle 2 is in the illustrated embodiment obtained by a gear wheel 7, disposed on the upper end of said shaft. This wheel is caused to rotate by means on an elongated pinion 8 of the shaft.

The elongated form of pinion 8 is provided to enable the gear wheel 7, the shaft 5 and the nozzle 2 to slide in the axial direction, without losing the intermeshing contact therewith. This axial movement of the parts is in the illustrated embodiment necessary, on account of the fact that the nozzle 2 is arranged to be extended into the mould 1 as illustrated. The lowering of the nozzle to the position illustrated on the drawing is caused by means of a cam means 9 acting upon the top side of the gear wheel 7, said nozzle being provided with a pressure spring 10 arranged around shaft 5, between the upper end of bearing sleeve 6 and the lower end surface of a depending mounting shoulder 11 on wheel gear 7. The shaft of cam means 9 and the shaft of pinion 8 are intended to be mounted in the supporting pillar (not shown on the drawing).

The mounting shoulder 11 of gear wheel 7 is, in the illustrated embodiment, formed as a connecting fitting to a communicating pipe 12 extending radially to the channel 4. The outer end of this pipe is, by way of a coupling 13, connected to a flexible hose 14. This hose 14 is provided to act as a connection to a feed means of chocolate material, the feeding being synchronized with the rotation of the cam means 9 and with the reciprocating and rotating movements of the nozzle. Any spraying of the mould wall with chocolate material is thus not supposed to occur except when the nozzle 2 is disposed in the position shown on the drawing, so that any spraying onto the horizontal portions 16 of the sheet, between the separate depressions, is eliminated. To safeguard against any such unintentional spraying of these sheet portions, a shield means 15 is provided on the top of nozzle 2, the shield having the form of an annular plate with its peripheral edge provided with a depending annular shoulder, by lower edge of which extends down into the mould. By the use of this device according to the invention, chocolate material will be applied substantially along the wall of the mould, as illustrated by line 16. The thickness of the moulding will be determined by adjustment of the spraying capacity and the time of spraying.

The moulds and the moulded material is supposed be cooled after, or possibly during, the spraying. This cooling is obtained by blowing cool air towards the moulds. As the cooling may occur in various ways, said cooling devices are not illustrated on the drawing.

Although the invention has been described and illustrated in detail, it is to be understood that this does not delimit the invention. The spirit and scope of this invention is limited only by the language of the appended claims.

What I claim is:

1. A molding device for confectionery to form a coating of approximately uniform thickness in open molds formed as recesses in a flat sheet and comprising at least one nozzle having a plurality of openings arranged at various angles to the axis of the nozzle and being movable into one of the recesses; feed means connected to said nozzle for selectively feeding molten confectionery thereto; means for rotating said nozzle while the molten confectionery is fed to and sprayed from said nozzle; and shield means being of less dimension than the opening into the recess in the plane of the flat sheet and being fixedly mounted on said nozzle above said plurality of openings and during spraying said shield means is maintained substantially flush with the plane of the flat sheet to prevent the escape of the confectionery spray from the mold.

2. A molding device as claimed in claim 1 wherein said shield means is a flat annular plate extending from said nozzle, having an annular shoulder depending perpendicularly therefrom about the outer periphery.

3. A molding device as claimed in claim 1 wherein said nozzle includes a hollow shaft forming a conduit connected at the upper end to said rotating means and feeding means, and at the lower end to a portion having said plurality of openings, said openings communicating with conduit means and arranged at various angles ranging from parallel to perpendicular to the axis of said hollow shaft.

4. A molding device as claimed in claim 3 and further comprising a reciprocating means to move said plurality of openings into the recess during spraying and to remove them to facilitate the introduction of a new recess, said reciprocating means including a biasing means urging said hollow shaft out of the mold and cam means for selectively overriding said biasing means to force said hollow shaft into the recess.

5. A method for molding confectionery in open molds formed as recesses in a flat sheet to form a coating of approximately uniform thickness therein comprising the steps of feeding molten confectionery to at least one nozzle having a plurality of openings arranged at various angles to the axis of the nozzle and movable into one of the recesses; rotating said nozzle during said feeding step which results in a spray of molten confectionery being directed into the open recess; and preventing the escaping of the confectionery spray by providing a flat annular shield means with a perpendicular shoulder fixedly mounted on said nozzle above the plurality of openings.

References Cited

UNITED STATES PATENTS

| 2,827,009 | 3/1958 | Norris | 118—317X |
|---|---|---|---|
| 2,963,738 | 12/1960 | Brandes et al. | 18—Cap Seal Digest |
| 3,313,353 | 4/1967 | Williamson et al. | 239—288X |

LAVERNE D. KEIGER, Primary Examiner

R. I. SMITH, Assistant Examiner

U.S. Cl. X.R.

107—54; 118—24